(12) United States Patent
Pinlam et al.

(10) Patent No.: US 6,507,777 B1
(45) Date of Patent: Jan. 14, 2003

(54) SYSTEM AND METHOD FOR A REMOTE CALLING SYSTEM FOR AN AUTOMATIC GUIDED VEHICLE

(75) Inventors: Watcharin Pinlam, Pathumthanee (TH); Chalor Moogdaharn, Nakornsawan (TH); Youthachai Bupparit, Nonthaburi (TH)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/687,660

(22) Filed: Oct. 13, 2000

(51) Int. Cl.[7] .................. G06F 15/48; C06F 15/50; H04M 1/24
(52) U.S. Cl. .................. 701/23; 701/207; 340/988; 370/343
(58) Field of Search .................. 701/23, 24, 50, 701/117, 207; 180/168, 169; 318/568.12, 587; 340/988, 991; 370/343, 480, 493; 379/27.08, 93.25; 455/550, 555, 563, 575; 342/57

(56) References Cited

U.S. PATENT DOCUMENTS

| | | | | |
|---|---|---|---|---|
| 3,644,883 A | * | 2/1972 | Borman et al. ............... 340/23 |
| 4,023,753 A | * | 5/1977 | Dobler ........................ 246/5 |
| 4,831,539 A | * | 5/1989 | Hagenbuch ................. 364/449 |
| 4,852,086 A | * | 7/1989 | Eastmond et al. ......... 370/69.1 |
| 4,922,516 A | * | 5/1990 | Butler et al. .................. 379/21 |
| 4,956,777 A | * | 9/1990 | Cearley et al. ........ 364/424.02 |
| 4,987,540 A | * | 1/1991 | Luke, Jr. ............... 364/424.02 |
| 5,111,401 A | * | 5/1992 | Everett, Jr. et al. ..... 364/424.02 |
| 5,113,427 A | * | 5/1992 | Ryoichi et al. ................ 379/57 |
| 5,925,080 A | | 7/1999 | Shimbara et al. ............. 701/23 |
| 5,931,875 A | * | 8/1999 | Kemner et al. ................ 701/23 |
| 5,956,650 A | * | 9/1999 | Suzuki et al. ............... 455/550 |
| 5,961,559 A | | 10/1999 | Shimbara et al. ............. 701/23 |
| 6,019,563 A | * | 2/2000 | Murata et al. ......... 414/222.01 |

* cited by examiner

Primary Examiner—Tan Nguyen
Assistant Examiner—Dalena Tran
(74) Attorney, Agent, or Firm—Foley & Lardner

(57) ABSTRACT

A system and method for a remote calling system for an automatic guided vehicle is disclosed herein. The remote calling system is configured to receive a destination request from an operator located at a remote location. The remote calling system is further configured to check the availability of the automatic guided vehicle at each of the parking lots. When at least one automatic guided vehicle is available at a parking lot, the remote calling system transmits the destination request to that parking lot. The remote calling system utilizes a telephone communication system.

31 Claims, 3 Drawing Sheets

SYSTEM AND METHOD FOR A REMOTE CALLING SYSTEM FOR AN AUTOMATIC GUIDED VEHICLE

FIELD OF THE INVENTION

The present invention relates to automatic guided vehicles. More particularly, the present invention relates to a remote calling system for an automatic guided vehicle.

BACKGROUND OF THE INVENTION

Automatic guided vehicles (AGVs) are utilized to transport a variety of items within a workplace. AGVs are vehicles or transporters that are programmed to travel along a prearranged travel path and transport selected items between two or more points along the travel path. Once a destination has been specified to a given AGV, that AGV typically does not require additional human or operator intervention. Thus, AGVs are useful in a variety of environments that may be too hazardous for humans to be exposed to, and/or in situations where human presence would be harmful to the environment and/or the item(s) being transported. For example, AGV systems are employed in semiconductor manufacturing facilities.

Presently, instructions are provided to each AGV by an operator at a home or base station. As each AGV returns to the base station after its transport job has been completed, the operator can provide new instructions requesting that a given AGV travel to a particular loading or pick-up station along the prearranged travel path. Typically, the operator would program a given AGV by activating a specific switch or button, corresponding to a specific loading station, on a control panel of that AGV. Thus, the operator is required to be physically present at the base station to provide instructions to any AGV.

Thus, there is a need for a system and method for providing remote operator instructions to an AGV system. Further still, there is a need for a system and method that can accommodate a plurality of remote operator instructions and appropriately cue the AGVs as they become available. Even further still, there is a need for a remote calling feature for an AGV system that can be adapted to an existing AGV system with a minimum of dedicated/specialized components and/or modifications to the existing on-site instruction scheme.

BRIEF SUMMARY OF THE INVENTION

One exemplary embodiment relates to a method of remotely instructing an automatic guided vehicle system having at least one parking lot. The method includes communicating a destination request to the automatic guided vehicle system from a remote location. The method further includes checking an availability status at the at least one parking lot and transmitting the destination request to the at least one parking lot having an available automatic guided vehicle. The destination request is inputted using a telephone communication system.

Another exemplary embodiment relates to a remote destination instruction system of an automatic guided vehicle system. The system includes a controller configured to receive incoming information from an operator located at a remote location and transmit outgoing information to the operator. The system further includes a controller configured to communicate with an automatic guided vehicle present at a parking lot of the automatic guided vehicle system to fulfill a destination request received from the operator.

Still another exemplary embodiment relates to a system for remotely instructing an automatic guided vehicle system having at least one parking lot. The system includes means for communicating a destination request to the automatic guided vehicle system from a remote location. The system further includes means for checking an availability status at the at least one parking lot. The system still further includes means for transmitting the destination request to the at least one parking lot having an available automatic guided vehicle. The destination request is inputted using a telephone communication system.

BRIEF DESCRIPTION OF THE DRAWINGS

Exemplary embodiments will hereinafter be described with reference to the accompanying drawings, wherein like numerals denote like elements, and.

DETAILED DESCRIPTION OF THE EXEMPLARY EMBODIMENTS

Figure 1:
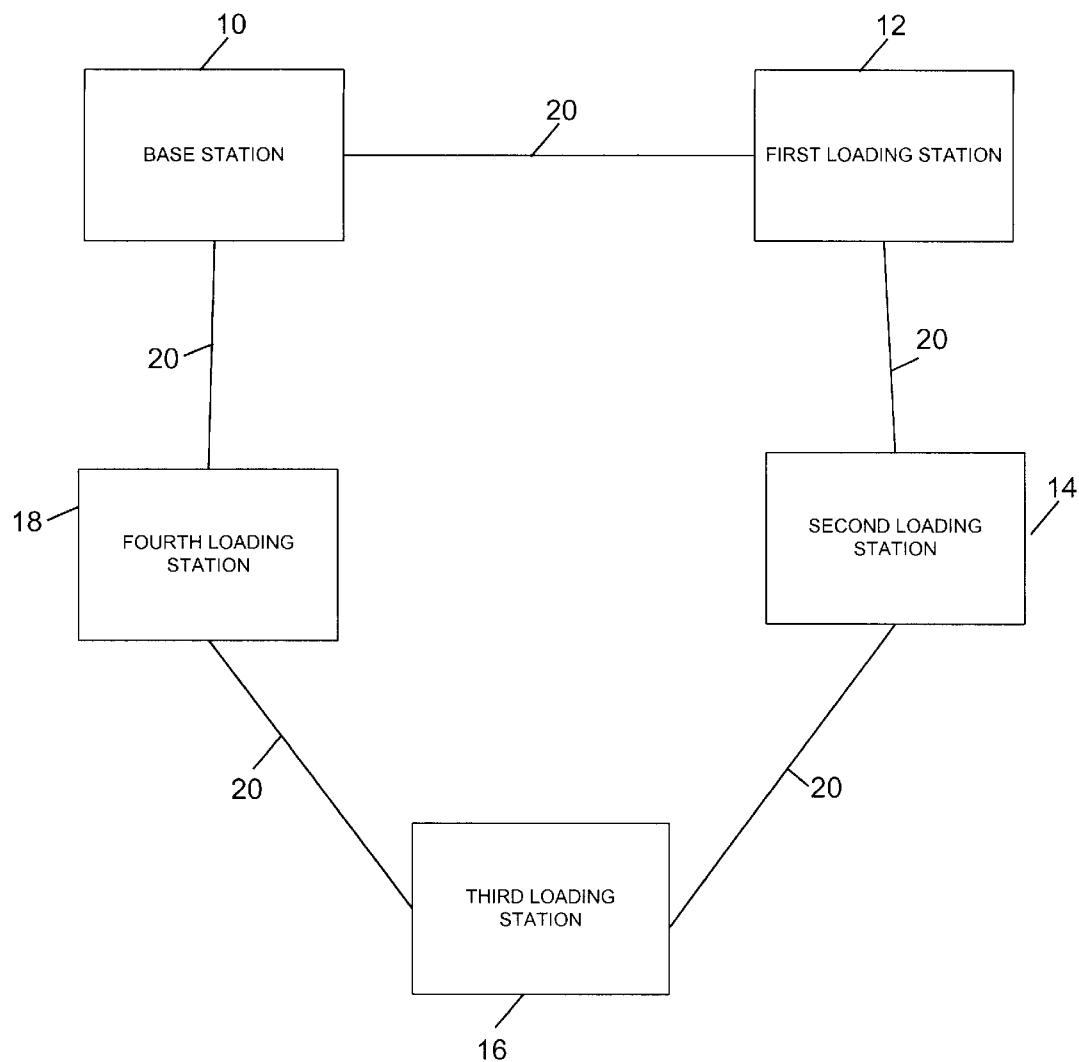
FIG. 1 is a block diagram of an automatic guided vehicles system in accordance with an exemplary embodiment.
Figure 2:
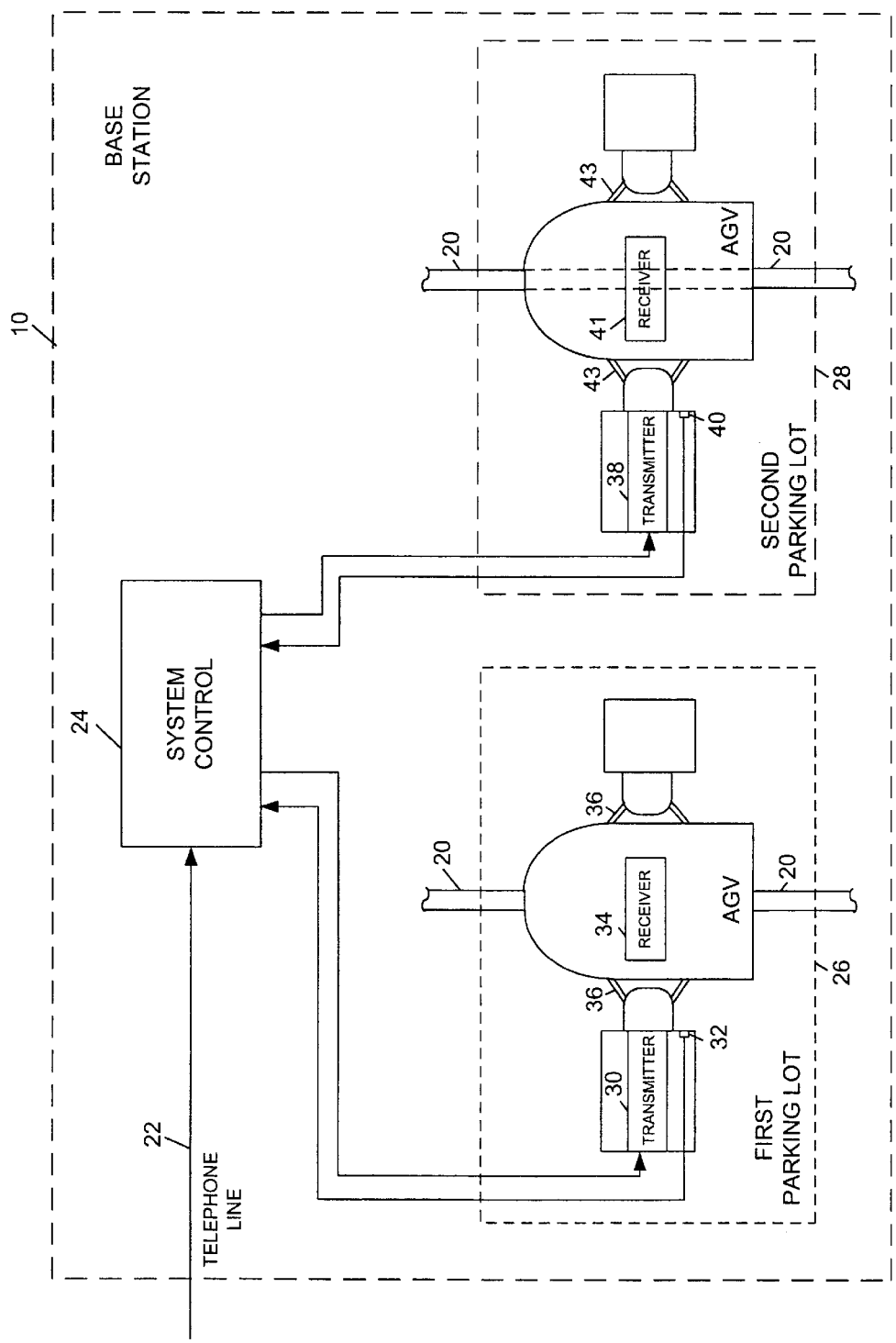
FIG. 2 is a block diagram of a base station, which is a portion of the automatic guided vehicles system illustrated in FIG. 1.
Figure 3:
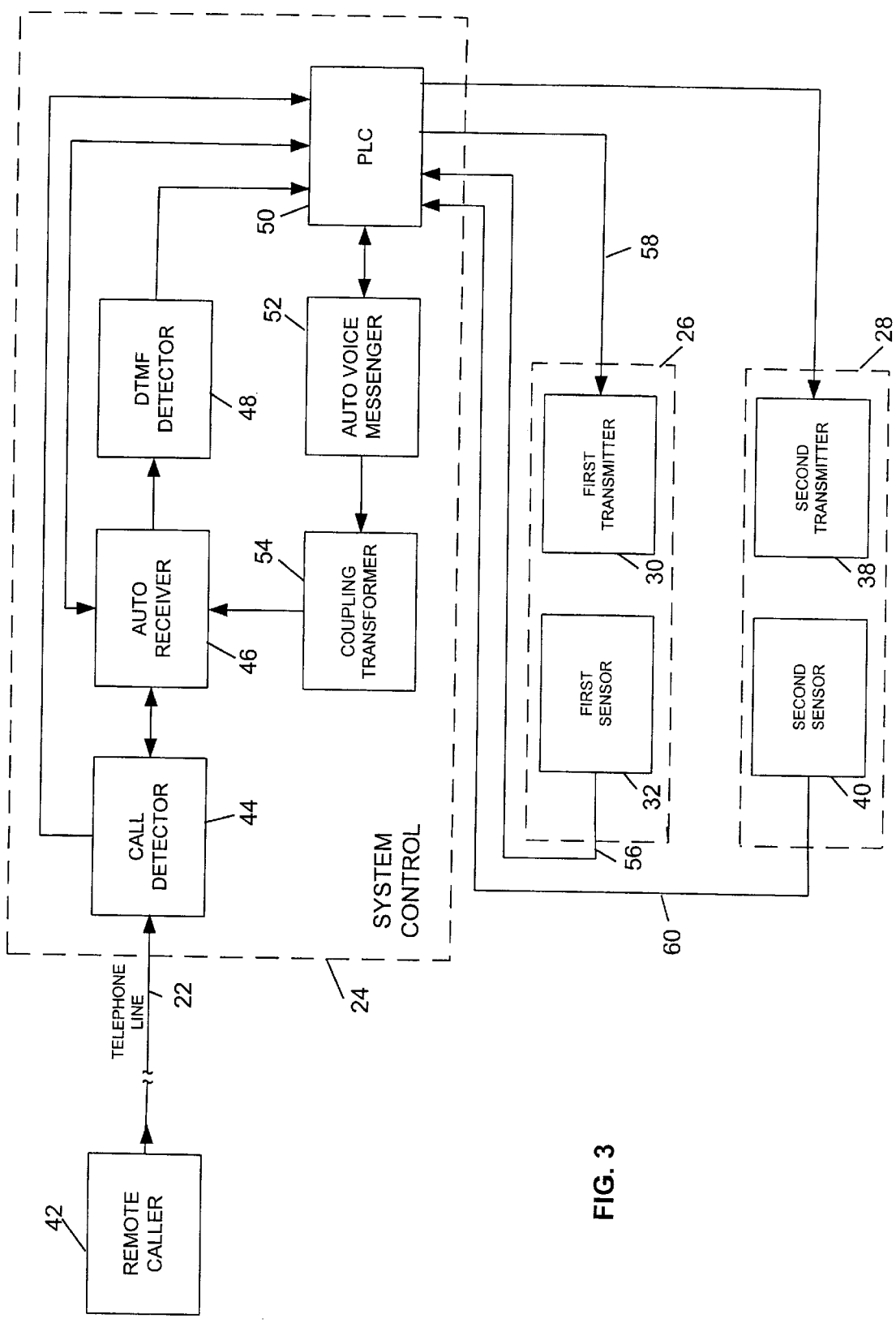
FIG. 3 is a block diagram of a remote calling scheme of the automatic guided vehicles system illustrated in FIG. 1.

FIGS. 1–3 illustrate an advantageous system and method for a remote calling scheme for an automatic guided vehicles (AGVs) system. The remote calling scheme is configured to permit an operator to remotely provide specific destination instructions to one or more AGVs. The remote calling scheme can be utilized in other types of vehicles or transporters where such vehicles move between two or more points along a prescribed route.

Referring to FIG. 1, one embodiment of the AGV system is shown. A travel path is prescribed by a base or home station 10, a first loading station 12, a second loading station 14, a third loading station 16, a fourth loading station 18, and a path guide 20. In this embodiment the travel path is shown to be a closed loop, however, it should be understood that the travel path may alternatively comprise a variety of configurations, such as a linear travel path, include more or less than four loading stations, include more than one base station, and/or complex travel paths.

Each of loading stations 12–18 may be a dedicated room, a section of a building, a building, or a specific point along the travel path where the AGVs may be instructed to stop or slow down in order to pick-up or drop-off certain items. Base station 10, to be described in greater detail hereinafter, may also be a dedicated room, a section of a building, a building, or a specific point along the travel path where the AGVs are parked when not in use and where they would receive route instructions from. The specific configuration of each of stations 10–18 is dependent on a variety of factors, such as, among others, the nature of the items being transported by the AGVs, the size of the facility being served by the AGVs, the loading/unloading mechanisms relating to the AGVs, and the travel path. Base station 10 is preferably the storage area for the AGVs and the location at which the AGVs receive their destination instructions (i.e., which loading stations to travel to and pick-up item(s) from).

Path guide 20 is laid on a floor to prescribe the travel path along which the AGVs may travel. Preferably path guide 20 is an optical guide tape or board that exhibits the property of being optically reflective. For example, path guide 20 can be a reflective, plastic-type tape. Each AGV can include one or more optical sensors of a photoelectric type to sense and maintain the travel route. Continuing the above example, optical sensors on the AGV can correspondingly be emitted laser beams such that reflected beam patterns are used to sense path guide 20 and guide the AGV along the travel path.

Alternatively, path guide 20 may be a magnetic guide tape or board and each AGV would include one or more magnetic sensors to sense the magnetic guide tape or board. It should be understood that a variety of other materials and/or components may comprise path guide 20 and the corresponding sensors on the AGVs, as long as they can perform the functions described above. In this manner, each AGV receives destination instructions at base station 10 (to be described in detail hereinafter) and travels from base station 10 to one of loading stations 12–18, as specified by the instruction.

Referring to FIGS. 2 and 3, one embodiment of the remote calling scheme is shown. In FIG. 2, base station 10 includes a telephone line 22, a system control 24, a first parking location 26, and a second parking location 28. First parking location 26 includes a first transmitter 30, a first sensor 32, and first battery charger contacts 36. Second parking location 28, includes a second transmitter 38, a second sensor 40, a second receiver 41, and second battery charger contacts 43.

When AGVs return to base station 10, each AGV will park or come to a rest mode at one of the parking locations (for example, first parking location 26). Each parking location is configured to provide housing, power (e.g., battery recharging), and new destination instructions to the AGV located therein. Continuing the example, at first parking location 26, power is provided to a given AGV by a battery recharge via first contacts 36, and new destination instructions via first transmitter 30 to first receiver 34 included on the AGV. Proper positioning of a given AGV within each parking location is aided by path guide 20 running therethrough (see FIG. 2).

First transmitter 30, first sensor 32, second transmitter 38, and second sensor 40 couple to system control 24. First and second transmitters 30, 38 are transmitters configured to transmit instructions (such as destination or pick-up instructions) to a receiver on the AGV (such as first receiver 34 on the AGV parked at first parking location 26, as shown in FIG. 2). Each of first and second transmitters 30, 38 is preferably an infrared transmitter and each receiver on the AGVs (such as receiver 34) is preferably an LED infrared receiver. Each of first and second sensors 32, 40 is configured to detect the presence of an AGV at its respective first and second parking locations 26, 28. First and second sensors 32, 40 are preferably reflective sensors. Alternatively, radio frequency (RF) transmitters and receivers can be utilized. It should be understood that such transmitters, receivers, and sensors are not limited to the types described above, but instead extend to a variety of types and configurations for performing the functions described herein.

It should also be understood that first and second parking locations 26, 28 are similar to each other and the description of first parking location 26 is applicable to second parking location 28. Moreover, although only first and second parking locations 26, 28 are shown in FIG. 2, it is contemplated that base station 10 may include more or less than two parking locations, to appropriately accommodate more or less than two AGVs included in the AGV system.

In one embodiment, system control 24 includes a call detector 44, an auto receiver 46, a dual tone multi-frequency (DTMF) detector 48, a programmable logic controller (PLC) 50, an auto voice messenger 52, and a coupling transformer 54. System control 24 receives inputs from telephone line 22, first sensor 32, and second sensor 40, and provides outputs to telephone line 22 and first and second transmitters 30, 38.

When a remote caller 42 (e.g., an operator of the AGV system) wants to instruct an AGV to travel to a particular loading station, he/she calls base station 10 using a standard telephone communication system. A calling signal (signifying the initiation of a call to base station 10) is transmitted via telephone line 22 to call detector 44. Telephone line 22 may be any telephone connection, such as, but not limited to, an internal line, a national line, an international line, wireless, etc.

Call detector 44 detects the presence of an incoming call by receipt of the calling signal, and converts this analog calling signal into a digital signal suitable for transmission to PLC 50. The digitized calling signal received by PLC 50 permits the telephone to ring a certain number of times (e.g., three rings) while the remote calling scheme is activated.

While the ringing is in progress, PLC 50 instructs auto receiver 46 to connect the remote calling system to telephone line 22. In response, auto receiver 46 connects the remote calling system to telephone 22 (i.e., auto receiver 46 "accepts" the incoming call, thereby causing the telephone to stop ringing) and transmits a system on-line signal to PLC 50 to indicate that a connection has been accomplished. Alternatively, if auto receiver 46 is unable to accomplish the connection, then auto receiver 46 transmits a system off-line signal or no signal to PLC 50. In any case, auto receiver 46 informs PLC 50 of the status of the system (i.e., connected/responsive or disconnected/non-responsive to telephone line 22). Auto receiver 46 is preferably a 24 volts direct current (DC) relay unit. Upon instructions from PLC 50, auto receiver 46 connects or disconnects the remote calling system (or more particularly, DTMF detector 48 and auto voice messenger 52) to telephone line 22 and correspondingly informs PLC 50 of the connection status of the system to telephone line 22. Auto receiver 46 also acts as a conduit for incoming and outgoing signals when the system is connected to telephone line 22 (to be described hereinafter).

Upon receipt of the on-line signal from auto receiver 46 to PLC 50, PLC 50 instructs auto voice messenger 52 to prompt remote caller 42 for identification and/or security information to verify that the caller is a person having proper access rights to the AGVs. The identification prompt/request signal is transmitted from auto voice messenger 52 to remote caller 42 via coupling transformer 54, auto receiver 46, call detector 44, and then telephone line 22. Auto voice messenger 52 is preferably a recorded media, memory, or device configured to store or generate a plurality of audio messages and transmit selected audio messages as instructed by PLC 50. Auto voice messenger 52 may be a hardware, firmware, and/or software device. Coupling transformer 54 is preferably a sound transformer, as is well-known in the art, configured to convert sound waves (such as those from auto voice messenger 52) into analog signals. Such analog signals are then digitized (such as by call detector 44) for transmission along telephone line 22. Thus, remote caller 42 may hear "enter your password" (or "key in your password") as a prompt from the remote calling system.

In response, the operator enters a password via a keypad included with his/her telephone. This inputted password is transmitted to PLC 50 via telephone line 22, call detector 44, auto receiver 46, and then DTMF detector 48. At DTMF detector 48, the inputted password (comprised of dialing signals or analog DTMF tones) is converted to a digital signal appropriate for PLC 50. Alternatively, the operator may enter the password by voice commands via a microphone included with his/her telephone. In this case, the remote calling system may include voice recognition and related processing components to provide appropriate signals to PLC 50.

Next, PLC 50 verifies the digitized inputted password. If the password is not acceptable or verifiable, then PLC 50 instructs auto voice messenger 52 to relay a message to remote caller 42 that the inputted password is invalid and to enter another password (via auto voice messenger 52, coupling transformer 54, auto receiver 46, call detector 44, and then telephone line 22, as described above). Otherwise, if the password is acceptable, then PLC 50 instructs auto voice messenger 52 to prompt the operator to enter a desired destination (i.e., specify a loading station). For example, the operator may be prompted with a message such as "enter destination" or "specify loading station" followed by a list of all the possible loading stations and its corresponding keypad or voice command numbers. Such messages would similarly be transmitted from auto voice messenger 52, coupling transformer 54, auto receiver 46, call detector 44, telephone line 22, and finally to remote caller 42. Alternatively, the list of loading stations and other related instructions may be omitted if the operator would otherwise know of or have ready access to such a list, or if the operator desires to bypass such instructions.

Accordingly, the operator inputs his/her desired destination via the keypad or microphone included in his/her telephone. For example, the operator may enter a "1" to specify first loading station 12; "2" to specify second loading station 14, "3" to specify third loading station 16; "4" to specify fourth loading station 18; "#" to specify completion of the entry; and "*" to correct the entry. In another example, the operator may enter a "1" to specify a shipping station; "2" to specify a finish unmark (FUM) station; "3" to specify a programmable logic device (PLD) station; "4" to specify a deflate trim form singulation/final outgoing inspection (DTFS/FOI) station; "5" to specify a non-volatile device (NVD) station; "6" to specify a mold station; "7" to specify an edging station; "8" to specify a solder plate station; "#" to specify completion of the entry; and "*" to correct the entry. Additional numbers such as "0," "9," and double digit combinations may be reserved for future stations and/or additional interactive features. Such destination entry is transmitted to PLC 50 via telephone line 22, call detector 44, auto receiver 46, and DTMF detector 48 for processing.

If PLC 50 finds the destination entry to be a valid entry, then PLC 50 instructs auto receiver 46 to disconnect from telephone line 22 (i.e., take the system off-line). Alternatively, PLC 50 may instruct auto voice messenger 52 to transmit a message to remote caller 42 to convey that the destination entry is valid, perhaps repeat the entered destination for operator verification, and/or prompt the operator to end the call (e.g., "Your destination request has been accepted. You may end the call at this time.") before instructing auto receiver 46 to disconnect from telephone line 22. Otherwise, if the destination entry is invalid, PLC 50 instructs auto voice messenger 52 to prompt the operator for another (and hopefully, valid) destination entry. This loop may repeat a certain number of times until a valid entry is received or the system may have a default setting to automatically terminate the call after a limited number of invalid entries.

It is also contemplated that more than one destination entry may be inputted by the operator during any given call to the remote calling system. In such an embodiment, auto voice messenger 52 would be configured to generate appropriate additional prompts and PLC 50 would be configured to store and/or cue the plurality of received destinations for transmission to available AGVs.

After PLC 50 has verified that a valid destination entry has been received, PLC 50 attempts to fulfill the destination request received from the operator based on AGV availability signals from all of the parking lots. As shown in FIGS. 2 and 3, a first AGV status or availability signal 56 and a second AGV status or availability signal 60 are continuously transmitted from and updated by first and second sensors 32, 40 on first and second parking lots 26, 28, respectively, to PLC 50. Thus, first and second parking lots 26, 28 keep track of the availability of AGVs, and when an AGV is present at any of the parking lots, PLC 50 will transmit an instruction or requested destination signal to the parking lot containing that available AGV. For example, if first signal 56 from first sensor 32 indicates that an AGV is present at first parking lot 26, then PLC 50 will transmit a first instruction signal 58 to first transmitter 30 of first parking lot 26. In turn, first transmitter 30 will transmit this instruction to first receiver 34 of the available AGV, thereby activating that AGV to travel to the requested destination.

Otherwise, if no AGV is available to receive the requested destinations, then destination entry or entries requested by the operator(s) is stored in PLC 50 to be fulfilled as AGVs become available on a first-in first-out basis. It should be understood that destination requests may alternatively be stored in a separate storage device.

In this manner, AGVs can be instructed to travel to any loading station along its prescribed route by an operator at a different location from the base station housing the AGVs. The remote calling system can be implemented with little modifications and/or additions to existing AGVs or base stations. Furthermore, the remote calling system increases efficient use of the operators' time (since he/she no longer needs to be physically present at the base station to instruct the AGVs nor wait for AGVs to become available to manually provide instructions thereto), maximizes utilization of the AGVs (since destination requests are fulfilled as soon as any AGV becomes available), and increases the number of people who can provide destination requests to the AGVs.

It is understood that, while preferred embodiments, examples, configurations, and components are given, they are for the purpose of illustration only. The apparatus and method of the exemplary embodiments are not limited to the precise details and conditions disclosed. For example, the, initial prompt for a password may also include instructions and/or prompts to enter the destination request. In another example, PLC 50 may further process and/or order the plurality of received destination requests such that destination requests for stations that are proximate to each other may be fulfilled by any single AGV, or such that an AGV may travel to more than one station before returning to the base station. In still another example, the remote calling scheme may be configured to provide additional instructions to the AGVs, such as requesting service of a particular AGV, requesting that one or more particular AGVs undergo maintenance and/or upgrading, or checking the health of the AGVs by requesting them to run a diagnostic program. Thus, various changes may be made to the details disclosed without departing from the spirit of the invention, which is defined by the following claims.

What is claimed is:

1. A method of providing a destination request to an automatic guided vehicle, the method comprising the steps of:

communicating the destination request from a first location to a second location using a telephone communication system, the first and second locations remotely located from each other;

checking for the presence of at least one automatic guided vehicle at the second location; and transmitting the destination request to the automatic guided vehicle at the second location when the automatic guided vehicle is present at the second location.

2. The method of claim 1, wherein the transmitting step includes transmitting the destination request from a controller at the second location to a receiver included in the automatic guided vehicle at the second location, thereby activating the automatic guided vehicle for travel to a destination specified in the received destination request.

3. The method of claim 1, further comprising storing the destination request before the transmitting step when the checking step indicates that no automatic guided vehicle is present at the second location.

4. The method of claim 3, wherein the storing step includes storing a plurality of destination requests in accordance with the communicating step being repeated a plurality of times.

5. The method of claim 4, wherein transmitting the destination request includes transmitting each of the stored plurality of destination requests on a first-in first-out basis.

6. The method of claim 4, further comprising processing the plurality of destination requests based on one or more criterions to facilitate efficient use of the automatic guided vehicle, and wherein transmitting the destination request includes transmitting the plurality of destination requests as dictated by the processing step.

7. The method of claim 1, further comprising connecting a remote destination request system at the second location to the telephone communication system when an operator at the first location initiates a connection request.

8. The method of claim 1, further comprising communicating at least one instruction from the second location to an operator at the first location, the at least one instruction selected from a group including a password prompt instruction, a destination request instruction, a destination verification instruction, and an end communication instruction, and the operator at the first location communicating a security access code to the second location before communicating the destination request to the second location.

9. The method of claim 1 wherein the automated guided vehicle includes a controller, wherein the controller receives incoming information from and transmits outgoing information to an operator at a remote location via a telephone communication system, wherein the controller includes a dial tone multifrequency (DTMF) detector and a processor to receive incoming information from the operator, wherein the DTMF detector is coupled to the telephone communication system and the processor is coupled to the DTMF detector.

10. A remote destination instruction system of an automatic guided vehicle system, comprising:

a controller configured to receive incoming information from an operator located at a remote location, transmit outgoing information to the operator, and communicate with an automatic guided vehicle present at a parking lot of the automatic guided vehicle system to fulfill a destination request received from the operator;

wherein the controller receives incoming information from and transmits outgoing information to the operator at the remote location via a telephone communication system; and wherein the controller includes a dial tone multifrequency (DTMF) detector and a processor to receive incoming information from the operator, wherein the DTMF detector is coupled to the telephone communication system and the processor is coupled to he DTMF detector.

11. The system of claim 9, wherein the controller includes a call detector coupled to a processor, the call detector configured to be responsive to incoming and outgoing information.

12. The system of claim 11, wherein the operator requests an initial connection to the controller, the call detector transmits the initial connection request to the processor, and the processor instructs a relay unit to connect the controller to the telephone communication system, wherein the relay unit is coupled to the call detector and to the processor.

13. The system of claim 10, wherein the controller includes a call detector and a relay unit, the call detector coupled to the relay unit and the relay unit coupled to the DTMF detector.

14. The system of claim 10, wherein the DTMF detector is configured to generate digital signal appropriate for the processor and representative of the incoming information, the incoming information representative of the operator's inputs to the telephone communication system.

15. The system of claim 10, wherein the controller includes an auto voice messenger, a coupling transformer, and a processor to transmit outgoing information to the operator, wherein the coupling transformer is coupled to the telephone communication system and the auto voice messenger, and the auto voice messenger is coupled to the processor.

16. The system of claim 15, wherein the controller includes a call detector and a relay unit, the call detector coupled to the relay unit and the relay unit coupled to the coupling transformer.

17. The system of claim 16, wherein the coupling transformer is a sound transformer configured to generate an analog signal representative of an audio message from the auto voice messenger, and at least one of the call detector and the relay unit is configured to generate a digital signal representative of the analog signal from the coupling transformer.

18. The system of claim 15, wherein the auto voice messenger is configured to generate the outgoing information, the outgoing information selected from a plurality of audio messages generated by the auto voice messenger that the processor selectively instructs the auto voice messenger to transmit to the coupling transformer.

19. The system of claim 10, wherein the incoming information is selected from a group including a password, the destination request, a destination request correction, a destination request deletion, and operator interactive requests related to providing the destination request to the controller.

20. The system of claim 10, wherein the outgoing information is selected from a group including a password prompt, a destination request prompt, another destination request prompt, a valid destination request receipt message, an invalid destination request receipt message, and a request completion message.

21. The system of claim 10, further comprising at least one sensor coupled to the controller, wherein the at least one sensor is included at the parking lot and the at least one sensor is configured to communicate an availability signal representative of the presence of the automatic guided vehicle at the parking lot.

22. The system of claim 10, further comprising at least one transmitter coupled to the controller, wherein the at least one transmitter is configured to receive the destination request from the controller and transmit it to the automatic guided vehicle present at the parking lot.

23. A system for remotely instructing an automatic guided vehicle, comprising:

means for communicating a destination request using a telephone communication system, the destination request provided from a remote location;

means for checking an availability status at a base station for the presence of the automatic guided vehicle; and means for transmitting the destination request to the automatic guided vehicle at the base station.

24. The system of claim 23, wherein the means for checking includes a reflective sensor at the base station.

25. The system of claim 23, further comprising means for storing the destination request when the availability status indicates that no automatic guided vehicle is present at the base station.

26. The system of claim 25, wherein the means for storing is configured to store a plurality of destination requests in accordance with the plurality of destination requests received in the means for communicating.

27. The system of claim 26, wherein the means for transmitting the destination request is configured to transmit each of the plurality of destination requests on a first-in first-out basis.

28. The system of claim 26, further comprising means for processing the plurality of destination requests based on one or more criterions to facilitate efficient use of the available automatic guided vehicle, and wherein the means for transmitting the destination request is configured to transmit the plurality of destination requests as dictated by the means for processing.

29. The system of claim 23, further comprising means for connecting the means for communicating to the telephone communication system when an operator at the remote location initiates a connection request.

30. The system of claim 23, further comprising means for communicating at least one instruction to an operator at the remote location, the at least one instruction selected from a group including a password prompt instruction, a destination request instruction, a destination verification instruction, and an end communication instruction, and means for communicating a security access code to the base station by the operator at the remote location before the destination request can be communicated to the base station.

31. The system of claim 23 wherein the automatic guided vehicle includes a controller, wherein the controller receives incoming information from and transmits outgoing information to the operator at the remote location via a the telephone communication system, wherein the controller includes a dial tone multifrequency (DTMF) detector and a processor to receive incoming information from the operator, wherein the DTMF detector is coupled to the telephone communication system and the processor is coupled to the DTMF detector.

* * * * *